US012789922B2

(12) United States Patent
Morgan

(10) Patent No.: US 12,789,922 B2
(45) Date of Patent: Nov. 10, 2026

(54) APPARATUS FOR AERODYNAMIC TRAILER SKIRT

(71) Applicant: Trailer Aerodynamics LLC, Chicago, IL (US)

(72) Inventor: Justin Kane Morgan, Greenville, SC (US)

(73) Assignee: Trailer Aerodynamics LLC, Chicago, IL (US)

( * ) Notice: Subject to any disclaimer, the term of this patent is extended or adjusted under 35 U.S.C. 154(b) by 256 days.

(21) Appl. No.: 18/724,062

(22) PCT Filed: Dec. 29, 2021

(86) PCT No.: PCT/US2021/065499
§ 371 (c)(1),
(2) Date: Jun. 25, 2024

(87) PCT Pub. No.: WO2023/129151
PCT Pub. Date: Jul. 6, 2023

(65) Prior Publication Data
US 2025/0083755 A1 Mar. 13, 2025

(51) Int. Cl.
*B62D 35/00* (2006.01)

(52) U.S. Cl.
CPC .................................. *B62D 35/001* (2013.01)

(58) Field of Classification Search
CPC ..... B62D 35/001; B62D 35/00; B62D 35/008
USPC ....................................................... 296/180.4
See application file for complete search history.

(56) References Cited

U.S. PATENT DOCUMENTS

| | | | | |
|---|---|---|---|---|
| 4,877,266 A * | 10/1989 | Lamparter | B60R 19/565 | 293/118 |
| 7,578,541 B2 * | 8/2009 | Layfield | B62D 35/001 | 296/180.2 |
| 8,191,956 B1 * | 6/2012 | Dixon, Jr. | B62D 35/02 | 296/180.1 |
| 8,292,351 B2 * | 10/2012 | Boivin | B60R 13/00 | 296/180.4 |

(Continued)

FOREIGN PATENT DOCUMENTS

| | | |
|---|---|---|
| CN | 106741184 A | 5/2017 |
| EP | 3356207 A1 | 8/2018 |
| WO | 2018097991 A1 | 5/2018 |

OTHER PUBLICATIONS

PCT International Search Report; Appln. No. PCT/US21/65499; Int'l Filing Date: Dec. 29, 2021; Completed Jun. 28, 2022; Mailed Jul. 8, 2022; 4 pgs.

*Primary Examiner* — Laura Freedman
(74) *Attorney, Agent, or Firm* — Hansen Reynolds LLC

(57) ABSTRACT

An apparatus is provided that includes a trailer mounting bracket configured to be mounted onto a trailer, and a bending member carried by the trailer mounting bracket. The bending member has a unitary section that is at least 3 millimeters in length in a lateral direction and is made of plastic, or rubber, or combinations of plastic and rubber. The bending member is also longer in length in a vertical direction than in the lateral direction and longitudinal directions. The bending member is configured for being deflected from an at rest position upon the application of force thereon, and can return to this position when the force is removed. Also, the bending member is configured for attachment to a skirt of a trailer.

20 Claims, 9 Drawing Sheets

(56) References Cited

U.S. PATENT DOCUMENTS

| | | | | |
|---|---|---|---|---|
| 8,303,025 | B2 * | 11/2012 | Senatro | B62D 35/001 296/180.1 |
| 8,608,122 | B2 * | 12/2013 | Mancina | F16B 2/12 248/228.2 |
| 9,272,741 | B2 * | 3/2016 | Gerst | B62D 35/001 |
| 9,409,610 | B2 * | 8/2016 | Baker | B62D 35/02 |
| 10,577,033 | B2 * | 3/2020 | Macherel | B62D 35/02 |
| 10,696,335 | B2 * | 6/2020 | Macherel | B62D 35/02 |
| 10,710,648 | B2 * | 7/2020 | Macherel | B62D 35/008 |
| 10,994,791 | B2 * | 5/2021 | Bradley | B62D 35/001 |
| 11,639,205 | B2 * | 5/2023 | Senatro | B62D 35/001 296/180.4 |
| 12,576,924 | B2 * | 3/2026 | Bradley | B62D 35/001 |
| 2012/0032475 | A1 | 2/2012 | Grandominico et al. | |
| 2024/0044348 | A1 * | 2/2024 | Morgan | F16B 2/065 |
| 2025/0171092 | A1 * | 5/2025 | Morgan | B62D 35/001 |
| 2025/0187681 | A1 * | 6/2025 | Morgan | B62D 35/001 |
| 2025/0196946 | A1 * | 6/2025 | Morgan | B62D 35/001 |

* cited by examiner

APPARATUS FOR AERODYNAMIC TRAILER SKIRT

CROSS-REFERENCE TO RELATED APPLICATION

The present application is a 35 U.S.C. § 371 application of PCT/US2021/065499 filed on Dec. 29, 2021, and entitled "APPARATUS FOR AERODYNAMIC TRAILER SKIRT" and claims benefit thereto. The entire contents of PCT/US2021/065499 are hereby incorporated by reference for all purposes.

FIELD OF THE INVENTION

The subject matter of the present invention relates to an apparatus that has a bending member for use in supporting aerodynamic trailer skirts. More particularly, the present application involves a support member for supporting a trailer skirt that features a bending member made of rubber, plastic, or combinations of rubber and plastic.

BACKGROUND OF THE INVENTION

Trailers towed by trucks and similar vehicles for transporting cargo can be large, unwieldy, and include geometries which invite inefficiencies during travel. One aspect of these inefficiencies concerns the aerodynamics of the trailer. In an effort to improve trailer aerodynamics, trailers have been built, supplemented, or retro-fitted with trailer skirts (or side skirts), devices affixed to the underside which limit air circulating in the empty space between the trailer's axles. By reducing the amount of airflow in this space, drag caused by turbulence is reduced. The reduction in drag permits the trailer to be towed more efficiently, increasing the gas mileage and performance of the vehicle and its cargo. Trailer skirts should be rigid enough to not deform in their normal operating condition to appropriately deflect air and prevent drag on the moving trailer, however the skirt needs to exhibit some degree of flexibility because it is close to the ground and can hit curbs, snow, road debris, or other objects thus necessitating movement of the skirt to prevent the skirt from being detached or damaged.

It is known to provide support members attached to the trailer that engage and support the skirt. These support members themselves can flex to accommodate flexing of the skirt when the skirt strikes an object. The support members include a bracket attached to the trailer and a bending member attached to the skirt that support the skirt in an aerodynamic position. The engagement between the bending member and the skirt is sometimes configured as a sliding arrangement such that the bending member slides along the skirt when the skirt is deflected outboard or inboard by a particular striking object. The bending member is made of spring steel, and once the deflection force is removed the skirt and bending member may spring back to their normal, at-rest positions.

Support members may fail because they could be designed in such a way that they do not bend evenly across the length of the support bracket which results in stress concentrations in the skirt panel. Other support members can include bending members made of material that does not spring back to the normal, at rest position once the force of impact onto the skirt is removed. Yet other support members fail because although the bending member can be flexed in one direction, it is incapable of being flexed in the opposite direction thus creating stress and damage on the mating components and fasteners when bent into this opposite direction. The support bracket may flex at a different radius than the skirt, and when this is not the case the components become damaged during flexing.

It is also the case that high frequency vibration through transport of the trailer skirt or multiple impacts can cause fatigue and thus failure in the support members. Other arrangements provide flexibility lower in the skirt but are easily damaged when contacted high by an obstacle. In this regard, failure occurs from too much stiffness at the higher impact locations. Colder temperatures are yet problematic for some designs of support members and materials they are made of as these temperatures can lead to their breaking.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
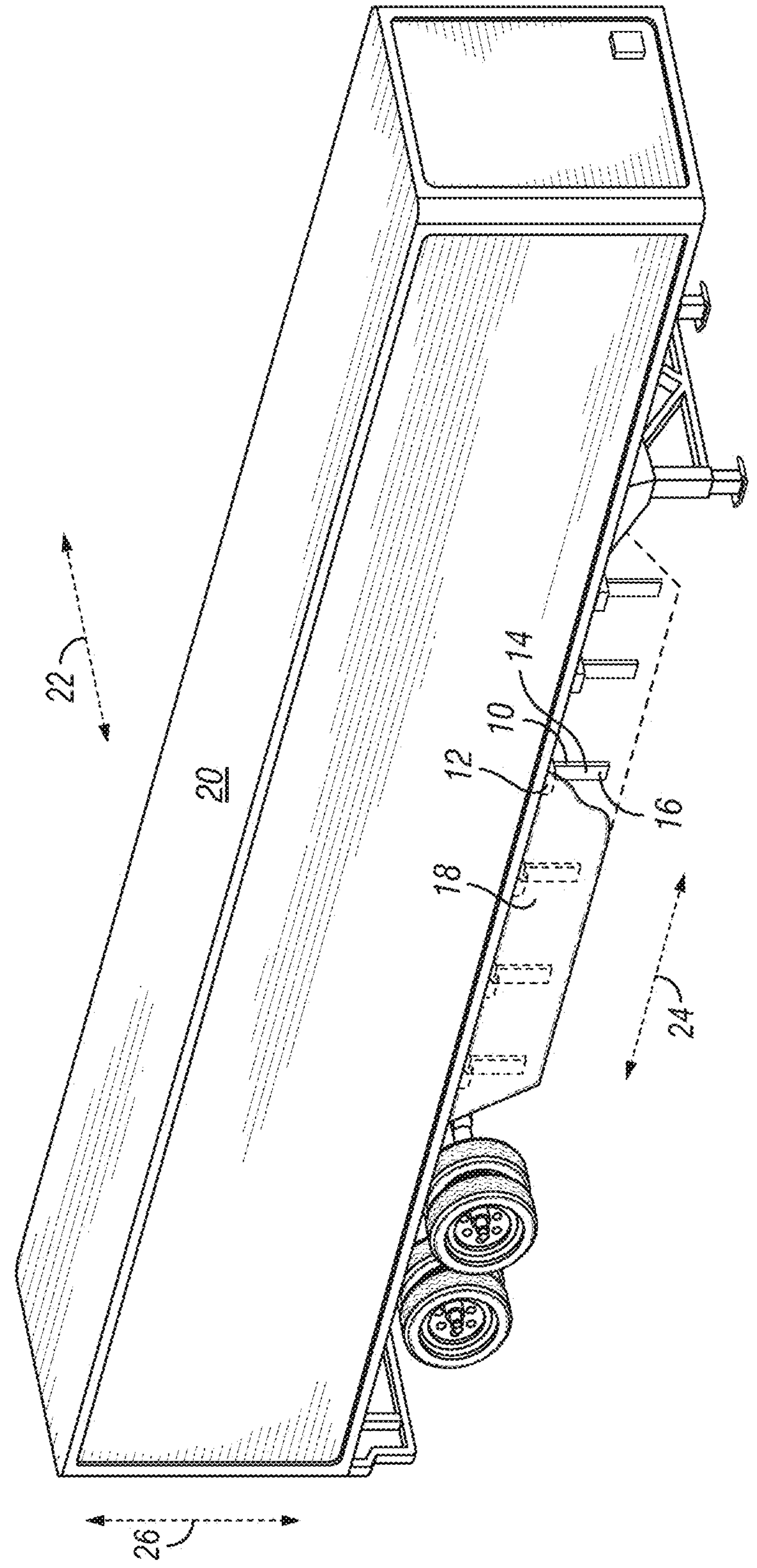
FIG. 1 is a perspective view of an aerodynamic trailer system attached to a trailer with a portion of the skirt shown in hidden lines for clarity.

Reference will now be made in detail to embodiments of the invention, one or more examples of which are illustrated in the drawings. Each example is provided by way of explanation of the invention and is not meant as a limitation of the invention. For example, features illustrated or described as part of one embodiment can be used with another embodiment to yield still a third embodiment. It is intended that the present invention include these and other modifications and variations.

The present invention provides for an apparatus 10 that has a bending member 14 that has a unitary section 16 that is made of rubber, plastic, or a combination of rubber and plastic. The unitary section 16 is at least 3 millimeters in length in the lateral direction 22. The bending member 14 is configured for attachment to a skirt 18 of a trailer, and is capable of being deflected from a normal, at-rest position when a force is applied to the bending member 14 to then return to the at-rest position once the applied force is removed. The material making up the unitary section 16 enables the bending member 14 to bend evenly in the vertical direction 26, and to bend both ways in the lateral direction 22 before returning to the at-rest position. The material making up the unitary section 16 reduces fatigue failure of the apparatus 10 from high frequency usage and repeated impacts, and the design of the apparatus 10 allows for flexibility in the lower area of the skirt 18 without being damaged by objects contacting the higher end of the apparatus 10 in the vertical direction 26. The apparatus 10 that features the unitary section 16 made of the aforementioned materials also provides a design that is resistant to breaking in colder weather usage.

An apparatus 10 fitted onto a trailer 20 is illustrated with reference to FIG. 1 in which the skirt 18 is located under the trailer 20 and prevents air from hitting the rear wheels of the trailer 20 during travel of the trailer 20. The skirt 18 extends in a longitudinal direction 24 and may be oriented at an angle to the trailer 20 or in some instances may extend in the same direction as the length of trailer 20. The skirt 18 can have any length in the longitudinal direction 24 but generally extends from the rear wheels to the vertical support of the trailer 20. A second skirt (not shown) can be located on the opposite side of the trailer 20 to prevent or direct air flow related to the opposite side. Any number of apparatuses 10 may be used to support the skirt 18. Brackets can be attached to the top of the skirt 18 and the bottom surface or I-beams of the trailer 20 to in turn attach the skirt 18 to the trailer 20. The opposite skirt (not shown) may likewise have any number of apparatuses 10 integrated therewith for its support. The skirt 18 can be held to the trailer 20 via only the apparatuses 10, or can be held onto the trailer 20 via the apparatus 10 and additional brackets. Still further, in other embodiments the skirt 18 can be held onto the trailer 20 solely by the brackets and the apparatuses 10 can be present not to hold the skirt 18 onto the trailer 20 but to instead support the skirt 18 upon deflection and act to push it back into its normal, at-rest position.

The height of the skirt 18 may be selected so that it is large enough to cover the necessary area of air deflection that is desired, yet small enough so that it is not scraping the ground or otherwise easily hitting the road surface or objects resting on the road surface. It is presumed, however, that in the normal course of driving the skirt 18 will strike objects when the trailer 20 navigates curves, goes over objects, reaches a crown in the road, hits a snowbank, or otherwise engages anything found on roads or in distribution centers.

Figure 2:
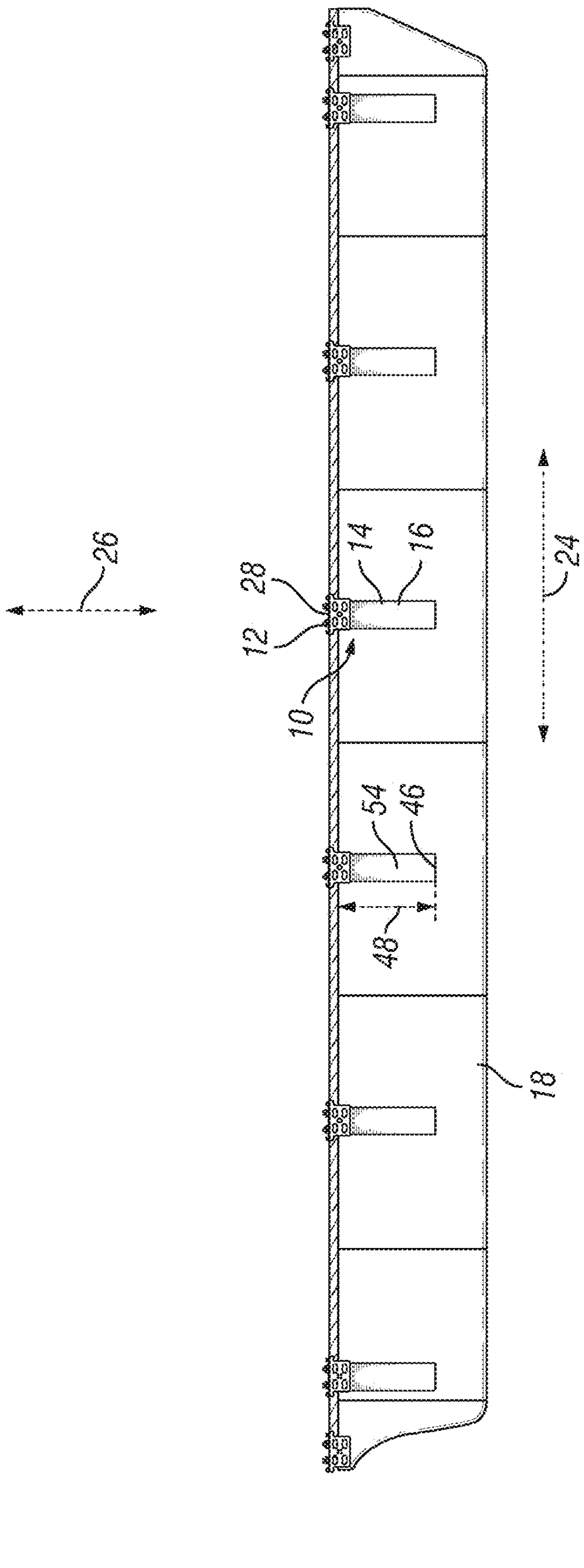
FIG. 2 is a side elevation view of the apparatus including the skirt, trailer mounting bracket, and bending member.

A back side view of the skirt 18 with the attached bending members 14 of the apparatus 10 is illustrated with reference to FIG. 2. A trailer mounting bracket 12 is attached to the trailer 20, for example through bolting, and the bending member 14 is attached to the trailer mounting bracket 12 and extends in the vertical direction 26. The bending members 14 and trailer mounting brackets 12 are located at the top of the skirt 18 in the vertical direction 26 and are generally spaced evenly from one another in the longitudinal direction 24. The bending members 14 extend from the top of the skirt 18 downward in the vertical direction 26 but do not extend the entire length of the height of the skirt 18. Instead, the bending members 14 stop short of the bottom of the skirt 18. The skirt 18 may be a single piece member made up of one component or can be multiple components that are attached to one another. In the embodiment in FIG. 2, the skirt 18 is made from a plurality of central panels that are attached to one another to form almost the entire length. A rear trailer skirt panel forms the back end of the skirt 18 and is attached to the tailing central panel. The rear trailer skirt panel has a shape and size different than the central panel to which it is attached. A front trailer skirt panel is located at the front of the skirt 18 and is attached to and shaped and sized differently than the leading central panel.

The bending members 14 may be configured in a variety of manners in accordance with different exemplary embodiments so that they perform the functions of supporting the skirt 18 and allow for bending of the skirt 18 to take place when the skirt 18 engages an object so that force is applied to the skirt 18. The bending member 14 may be elongate, and can be attached to the skirt 18 using any desired mechanism, such as by use of one or more fasteners, weldments, adhesives, clamps, and/or mounting brackets as previously stated.

Figure 3:
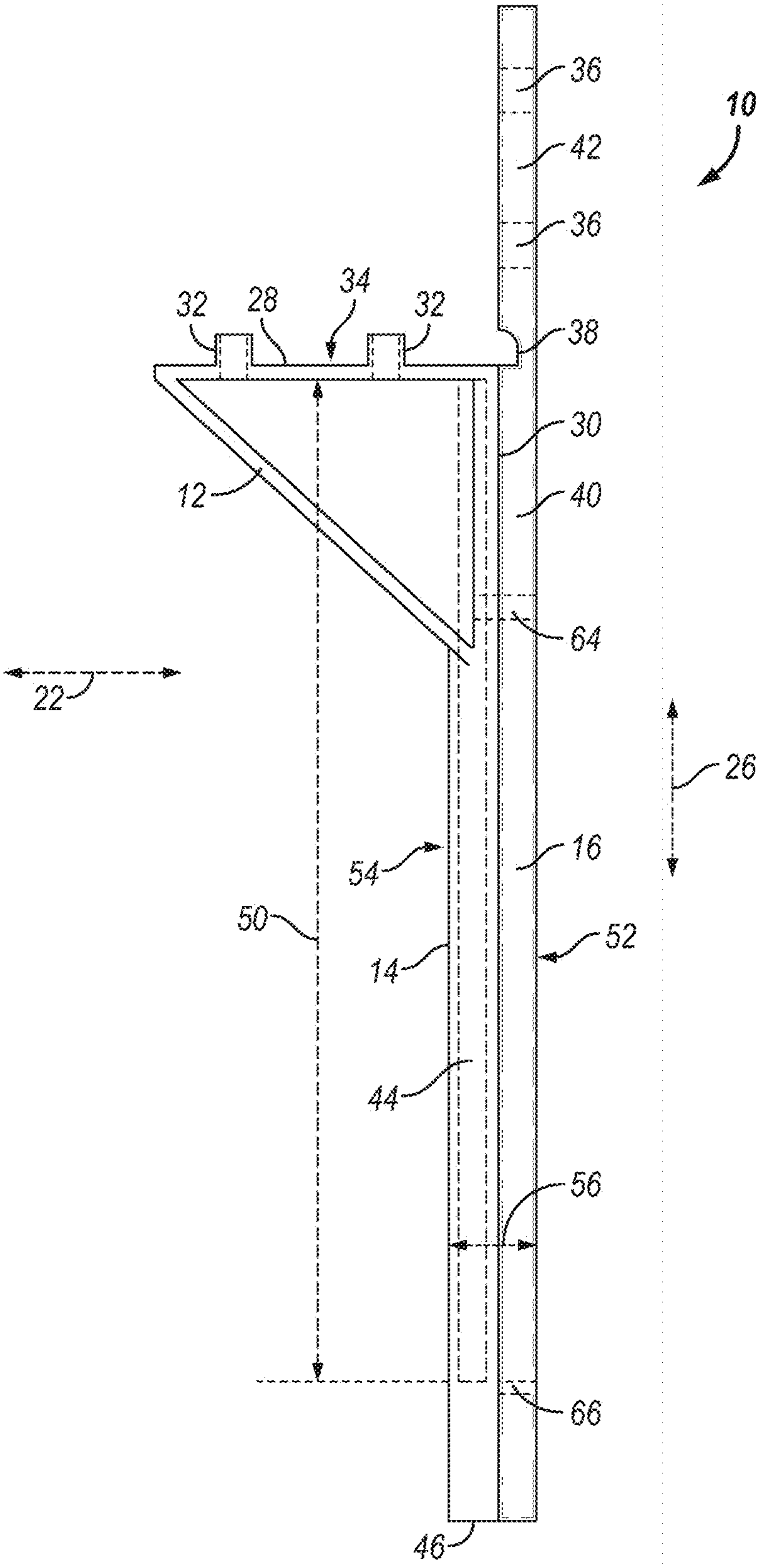
FIG. 3 is a back elevation view of an exemplary embodiment of the apparatus before a top section of the bending member is placed onto the top of the trailer mounting bracket.

One exemplary embodiment of the apparatus 10 is illustrated with reference to FIGS. 3-5. The apparatus 10 has a shape that is longer in the vertical direction 26 than in the lateral direction 22. The trailer mounting bracket 12 can be made of metal, plastic, or any other material and may be made of a material that is harder and more stiff than the material making up the bending member 14. The trailer mounting bracket 12 has a top surface 28 that can include a planar portion 34. The planar portion 34 may have a surface normal that extends upwards in the vertical direction 26. A plurality of embossments 32 extend upward from the planar portion 34 in the vertical direction 26. The embossments 32 have apertures that extend completely therethrough so that bolts or other mechanical fasteners can be positioned through them for use in securing the trailer mounting bracket 12 onto the trailer 20. The embossments 32 have upper surfaces that are located higher in the vertical direction 26 than the planar portion 34, and these upper surfaces in some instances may be parallel to the planar portion 34. The area below the embossments 32 in the vertical direction 26 can be accessed so that a bolt or other member can be moved through or positioned at the bottom of the apertures of the embossments 32.

Positioned at a ninety degree angle to the planar portion 34 is a side surface 30 of the trailer mounting bracket 12. A strut is shown extending from the planar portion 34 to the side surface 30 to add support to the trailer mounting bracket 12, but this strut need not be present in other embodiments. The strut can be made of more than one piece and may be hollow such that it has a cavity therein. The center of the trailer mounting bracket 12 between the planar portion 34, side surface 30, and strut can be empty or may be solid so as to be filled with the material making up the rest of the piece.

The bending member 14 is carried by the trailer mounting bracket 12 and includes a unitary section 16 that is at least 3 millimeters in length in the lateral direction 22. The unitary section 16 is made of a single piece and not multiple pieces in this at least 3 millimeters of length in the lateral direction 22. The unitary section 16 is thus distinguished from a stack of thin, 0.5 millimeter in thickness, metal sheets in that these sheets together are not a single unitary piece that is at least 3 millimeters in thickness. The unitary section 16 can be made of plastic, rubber, or combinations of plastic and rubber. In this regard, the unitary section 16 in different embodiments may be made of silicone, a thermoplastic elastomer, or a thermoplastic vulcanizate (TPV). The material making up the unitary section 16 provides a durable flexible skirt facing surface 52 to mount the skirt 18 thereon.

The stiffening member 44 provides stiffness to the unitary section 16 and keeps the rubber material straight.

The bending member 14 has a first portion 40 and a second portion 42 separated by a hinge 38. The unitary member 16 may extend from the first portion 40 to the second portion 42 and can also include the hinge 38. The hinge 38 may be integrally formed with the portions 40, 42 and can have a smaller amount of mass in the lateral direction 22 so that it can be said to be a weakened area of the bending member 14. The second portion 42 is not yet positioned on top of the top surface 28 in FIG. 3, but the hinge 38 is flexible enough to reposition the second portion 42 into an orientation 90 degrees from that depicted in FIG. 3. The second portion 42 includes embossment apertures 36 that extend completely through the second portion 42 and are sized and positioned so as to receive the embossments 32 when the second portion 42 is put onto the top surface 28.

The bending member 14 includes one or more apertures 64 through which a bolt or other fastener can be disposed to attach the trailer mounting bracket 12 to the bending member 14. Such aperture 64 can likewise be used for mounting the trailer mounting bracket 12 and bending member 14 to the skirt 18 via this same fastener. The bending member 14 also includes one or more apertures 66 through which a bolt can be disposed to further attach the bending member 14 to the skirt 18. With reference to FIG. 5, fasteners 68 which may be bolts are disposed through two apertures 64 to connect the trailer mounting bracket 12 to the bending member 14 and to the skirt 18. Fasteners 70 are likewise shown being disposed through two apertures 66 to attach the bending member 14 to the skirt 18. Any number of apertures and fasteners could be used to attach the apparatus 10 to the skirt 18. The arrangement of having a fastener attach multiple components such as trailer mounting bracket 12, second portion 42, and connection member 74 reduces the number of fasteners that are needed in the apparatus 10. The same hold true for the fasteners that attach components 12, 40 and 18 in that since multiple components are secured using the same fastener the number of fasteners necessary in the apparatus 10 are reduced.

The fasteners 70 can be provided to securely hold the bending member 14 to the skirt 18 such that the skirt 18 is not capable of moving relative to the bending member 14 in the vertical direction 26. In other embodiments, the fastener 70 could be configured into a sliding engagement to allow the bending member 14 to slide relative to the skirt 18. If the configuration of the unitary section 16 and the stiffening member 44 is provided to mimic the minimum bend radius (maximum amount the skirt 18 bends until it yields) of the skirt 18, the sliding arrangement with the fastener 70 would not be needed. However, even if this is not the case, the fastener 70 placed into the non-sliding configuration can still be used in the apparatus 10.

The trailer 20 includes a number of I-beams 62 that form the lower structure of the trailer 20 and support its floor. One of the I-beams 62 is shown in cross-section in FIG. 5, and the apparatus 10 is attached to the I-beam 62. In this manner, the skirt 18 is attached to the I-beam 62 of the trailer 20 via the apparatus 10. However, it is to be understood in other arrangements brackets separate from the apparatus 10 may be used to attach the skirt 18 to the I-beam 62 or other portion of the trailer 20. Although shown and described as being attached to the I-beam 62, the apparatus 10 may be attached to other portions of the trailer 20 in other embodiments. Although the apparatus 10 may be attached directly to the I-beam 62, a connection member 74 is used in the disclosed embodiment to make this attachment. First, the second portion 42 is folded onto the top surface 28 such that the embossment aperture 36 is fit onto the embossment 32 and the second portion 42 rests onto the planar portion 34. The connection member 74 rests onto the tops of the embossments 32 and their presence prevents the top portion 42 from being crushed and damaged by the attachment. The embossments 32 act as compression limiters to improve the attachment between the connection member 74 and the apparatus 10. This arrangement eliminates the undesirable effect of "creep" of the top portion 42 between the connection member 74 and the trailer mounting bracket 12 over time. The top portion 42 is thus securely held in place via capture between the connection member 74 and trailer mounting bracket 12 with the embossment apertures 36 locked onto the embossments 32. The embossments 32 may be made of the same material as the rest of the trailer mounting bracket 12.

The fastener 72 is disposed through the connection member 74, the aperture in the embossment 32, and thus through the embossment aperture 36 that surrounds the embossment 32. The fastener 72 is secured against the trailer mounted bracket 12 and tightened to cause the connection member 74 with attached apparatus 10 to be securely held onto the bottom flange of the I-beam 62. Additional fasteners 72 can be present and arranged in a similar manner so that four or more fasteners 72 function to attach the connection member 74 to the I-beam 62. The fasteners 72 serve a dual purpose of attaching the apparatus 10 to the I-beam 62 and in securing the bending member 14 to the trailer mounting bracket 12. This arrangement of the fasteners 72 functions to reduce the number of fasteners needed in the apparatus 10 assembly.

In order to increase the stiffness of the bending member 14, a stiffening member 44 can be incorporated into the bending member 14. The stiffening member 44 can be made of a material that is stiffer than that of the unitary section 16. In some embodiments, the stiffening member 44 is made of fiberglass. The stiffening member 44 may be spaced from the top of the trailer mounting bracket 12 in the vertical direction 26 to provide a hinge point to prevent breakage of the stiffening member 44 upon deflection of the bending member 14 with the incorporated stiffening member 44. In other embodiments, the stiffening member 44 may be located at the same position in the vertical direction 26 as the hinge 38 and can extend downward from there in the vertical direction 26 along at least 50 percent of the length 48 but not to the bottom terminal end 46. The stiffening member 44 has a length 50 in the vertical direction 26 that is less than the length 48 of the unitary section 16 in the vertical direction 26. However, the length 50 may be half of or more than half of the length 48, although the length 48 is larger than the length 50. The stiffening member 44 may extend to the bottom terminal end 46 of the bending member 14. However, as shown in FIG. 5 the stiffening member 44 stops short of and does not extend all the way to the bottom terminal end 46. Elimination of the stiffening member 44 at the bottom portion of the bending member 14 allows for greater flexibility of the apparatus 10 at the most impacted areas of the skirt 18 which are near the bottom of the apparatus 10 in the vertical direction 26.

The stiffening member 44 is shown as a single, continuous rod but it could be discontinuous in other embodiments so that it is made of multiple pieces to allow for more flexibility in certain areas of the bending member 14 and less in others. Any number of stiffening members 44 can be employed. The stiffening member 44 shown in FIG. 5 is located inside of the unitary section 16 and is not visible from outside of the bending member 14. The stiffening member 44 is located within the recess of the strut of the trailer mounting bracket 12 so that the stiffening member 44 has room to flex when the bending member 14 is deflected.

Figure 4:
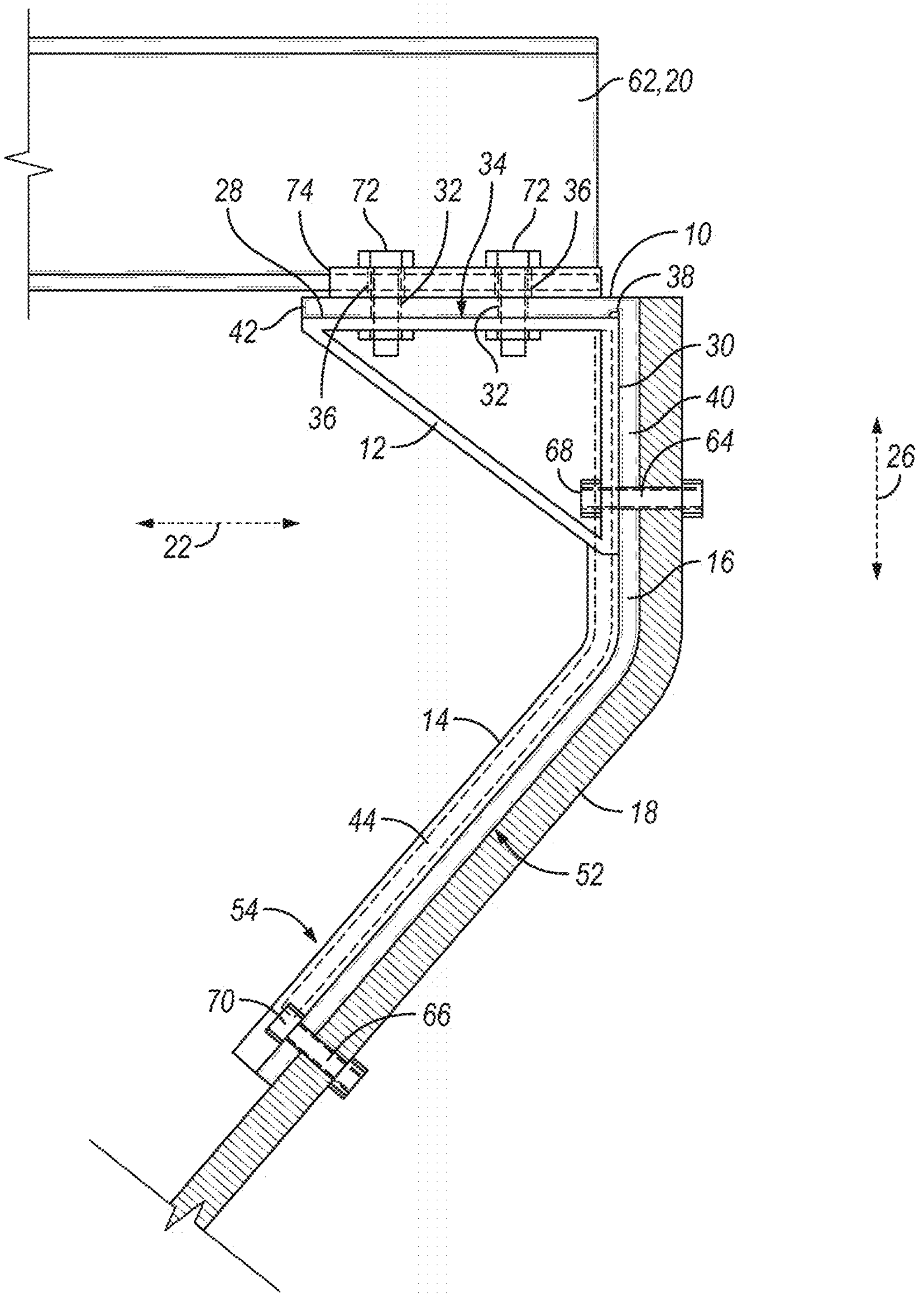
FIG. 4 is a back elevation view of the apparatus of FIG. 3 attached to the trailer skirt and to the trailer with the components bent due to an impact with an object.
Figure 5:
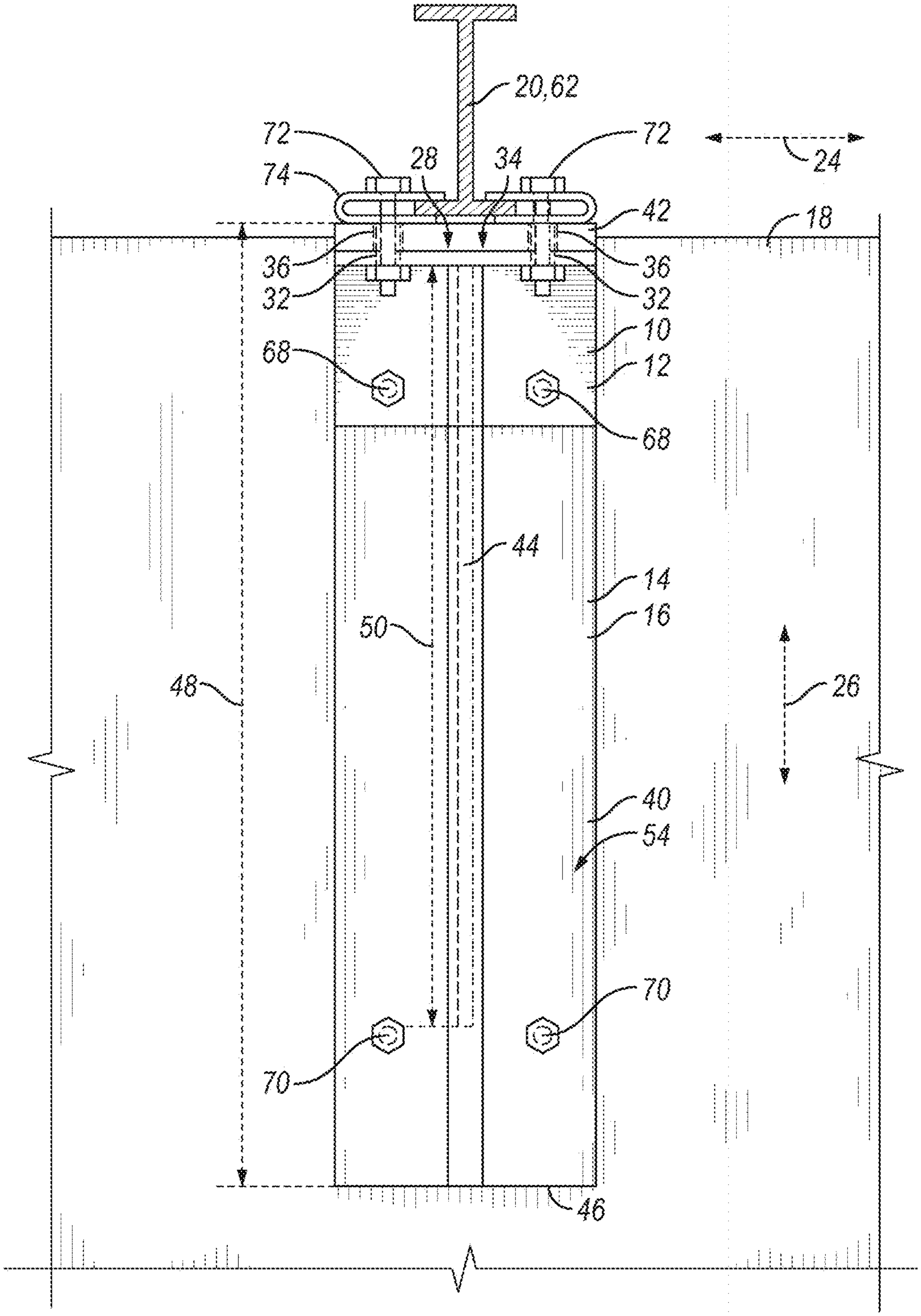
FIG. 5 is a side elevation view of the apparatus of FIG. 3 attached to the trailer skirt and to the trailer in an at rest position.

FIG. 4 shows the apparatus 10 with the second portion 42 bent onto the top surface 28 and the connection member 74 engaging the I-beam 62 via the fasteners 72. The skirt 18 is attached to the bending member 14 so as to engage a skirt facing surface 52 of the unitary section 16. Fasteners 70 attach the unitary section 16 to the skirt 18, and fasteners 68 attached the trailing mounting bracket 12, unitary section 16, and skirt 18 together. The skirt 18 is deflected through engagement with an object such that a force is applied to the skirt 18. The skirt 18 is moved from its normal, at rest position shown in FIG. 5 to a deflected position shown in FIG. 4. The unitary section 16 imparts a degree of flexibility to the bending member 14, and the stiffening member 44 imparts a degree of stiffness to the bending member 14. The flexing and stiffening characteristics imparted by members 16 and 44 can be tuned to match the radius of curvature of the skirt 18 to reduce or eliminate relative motion of the fasteners 68, 70 between the skirt 18 and the bending member 14. Matching the radius of curvature reduces stress on the fastening locations where the skirt 18 is attached to the bending member 14. The stiffening member 44 can be configured so that the bending member has different zones of stiffness in which some are stiffer than others. The size, shape, or location of the stiffening member 44 can be changed to create this tuning of the bending member 14.

The bending member 14 provides the apparatus 10 with the ability to bend both inward and outward in the lateral direction 22 so the apparatus 10 can handle deflection by objects in either of these directions. The deflection depicted in FIG. 4 is inboard in the lateral direction 22. The stiffness of the bending member 14 is strong enough to resist vibration due to wind loading brought about by transport of the trailer 20 on the road. The bending member 14 can be set to deflect 2 inches (at the bottom terminal end 46) in the lateral direction 22 upon the application of 50 pounds of force or greater, and this force may be applied by a member over at most two square feet of area of the skirt 18. If the bending member 14 is configured to be stiffer such that it will deflect 2 inches in the lateral direction 22 (at the bottom terminal end 46) only upon the application of more than 80 pounds of force over a two foot square area of the skirt 18 such a stiffer skirt 18 may have poor puncture resistance during impact events. The bending member 14 may thus be designed to deflect 2 inches at its bottom terminal end 46 upon the application of from 50-80 pounds of force along an area of no more than 2 square feet. The bending member 14 will spring back into its normal, at-rest position shown in FIGS. 3 and 5 when the force on the skirt 18 is removed.

Figure 6:
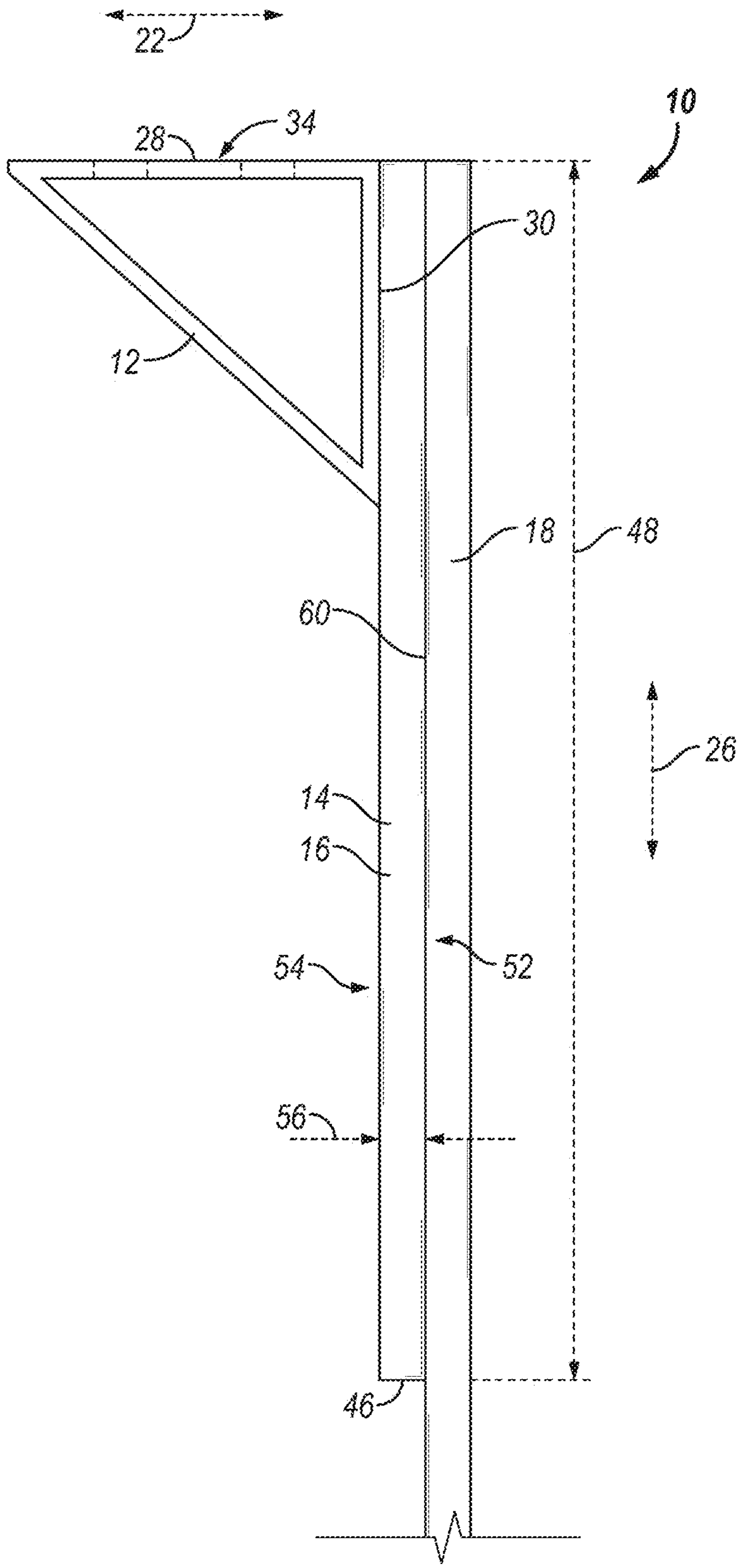
FIG. 6 is a back elevation view of another exemplary embodiment of the apparatus in which the bending member does not engage the top of the trailer mounting bracket.

FIG. 6 shows an alternative exemplary embodiment of the apparatus 10. Fasteners 64 and 66 are not present and are not used to attach the skirt 18 to the bending member 14. Instead, an adhesive 60 is used to attach the skirt 18 to the skirt facing surface 52 and thus cause attachment of the skirt 18 to the apparatus 10. The bending member 14 does not have a stiffening member 44, and is made up of only the unitary section 16. In different embodiments, the bending member 14 may include rubber of different durometers such that certain portions of the bending member 14 are stiffer than others. In this regard, the rubber of the bending member 14 can be made to a stiffness necessary to achieve the desired apparatus 10 performance.

The bending member 14 engages the side surface 30 but is not located on the top surface 28 and does not engage the planar portion 34. In this regard, the bending member 14 does not extend higher than the trailer mounting bracket 12 in the vertical direction 26. Different embodiments exist in which the bending member 14 does and does not wrap around the trailer mounting bracket 12 so as to be located on top of and not on top of the trailer mounting bracket 12.

The length 56 of the unitary section 16 extends from the inboard surface 54 to the skirt facing surface 52 in the lateral direction 22. The length 56 is at least 3 millimeters. The length 56 may be at least 5 millimeters, at least 10 millimeters, at least 25 millimeters, at least 40 millimeters, at least 50 millimeters, at least 60 millimeters, and at least 75 millimeters, from 3 to 20 millimeters, from 3 to 50 millimeters, from 3 to 70 millimeters in accordance with difference embodiments.

Figure 7:
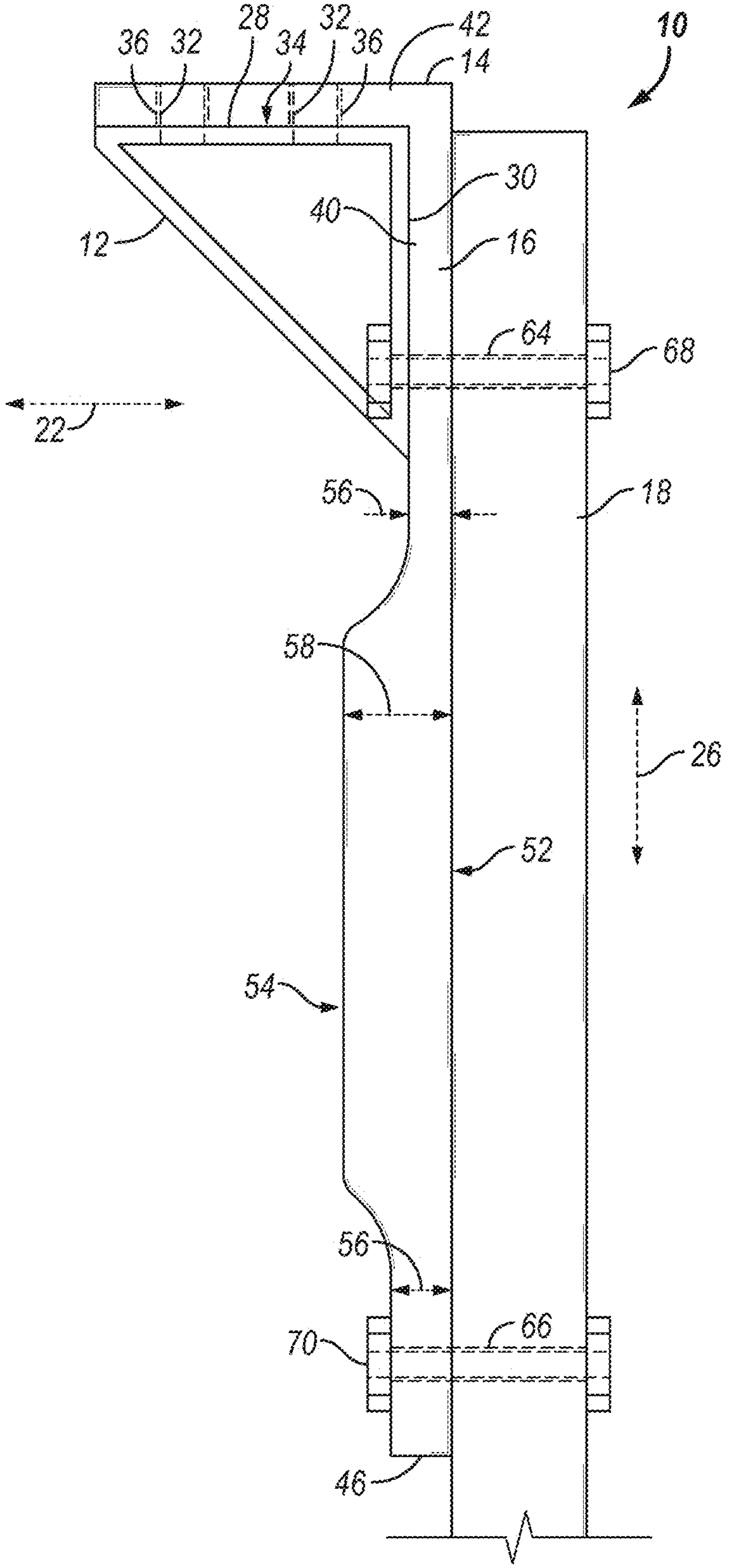
FIG. 7 is a back elevation view of another exemplary embodiment of the apparatus with a bending member attached to a trailer skirt and having a unitary member with thickness at different vertical locations.

FIG. 7 shows another exemplary embodiment of the apparatus 10 in which the bending member 14 includes a unitary section 16 that bends around the trailer mounting bracket 12 and is located on and engages the top surface 28. Fasteners 68 and 70 again are used to attach the skirt 18 to the bending member 14, and the trailer mounting bracket 12 to the unitary section 16 and skirt 18. A distinct stiffening member 44 is not present. Instead, the thickness of the unitary section 16 is modified at different regions in the vertical direction 26 to achieve a desired bending arrangement. The length 56 of the unitary section 16 is measured in the lateral direction 22 and extends from the inboard surface 54 to the skirt facing surface 52. The length 58 is greater than the length 56 and likewise extends in the lateral direction 22 from the inboard surface 54 to the skirt facing surface 52. The portion of the unitary section 16 that has length 58 is located at a different position in the vertical direction 26 than the portions of the unitary section 16 with length 56. The larger section with length 58 is spaced from the bottom terminal end 46 in the vertical direction 26. The length 58 may be twice as long or longer than length 56 that is located above and/or below the section of the unitary section 16 featuring length 58 in the vertical direction 26.

Figure 8:
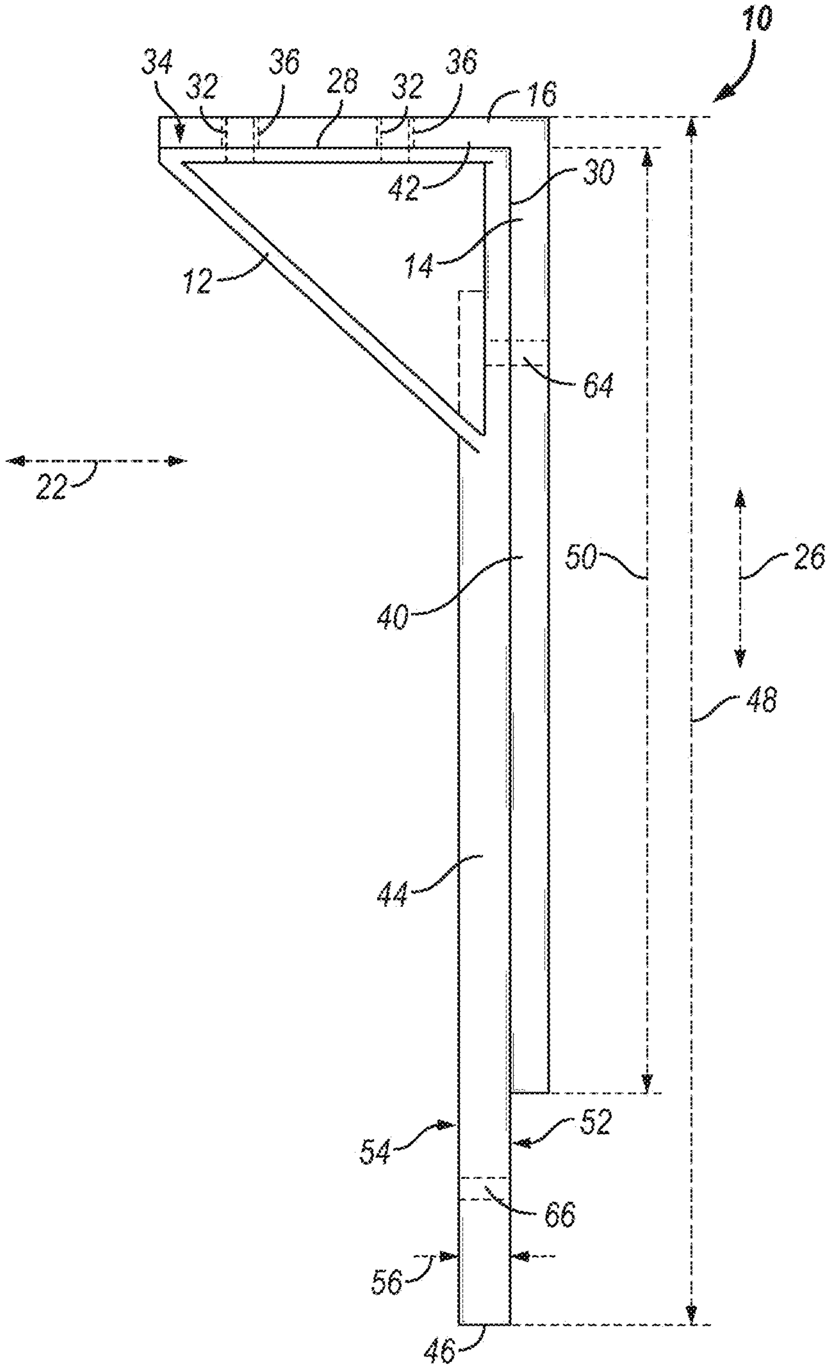
FIG. 8 is a back elevation view of another exemplary embodiment of the apparatus with a stiffening member located on an inboard surface of the unitary member.

Another embodiment of the apparatus 10 is shown with reference to FIG. 8. Here, the stiffening member 44 does extend to a position inside of the trailer mounting bracket 12 in the vertical direction 26, but does not extend all the way up to the top of the trailer mounting bracket 12. An amount of the bending member 14 that includes the unitary section 16 extends above the stiffening member 44 in the vertical direction 26 and the stiffening member 44 can bend in the lateral direction 22 upon deflection. The stiffening member 44 is not embedded within the unitary section 16, but is instead located on the inboard surface 54 of the unitary section 16. It is to be understood that the stiffening member 44 is an optional feature, and the flexibility and stiffness of the bending member 14 can be tuned using the profile and material of construction of the unitary member 16 in other embodiments. The stiffening member 44 could be injection molded plastic in accordance with certain exemplary embodiments.

Figure 9:
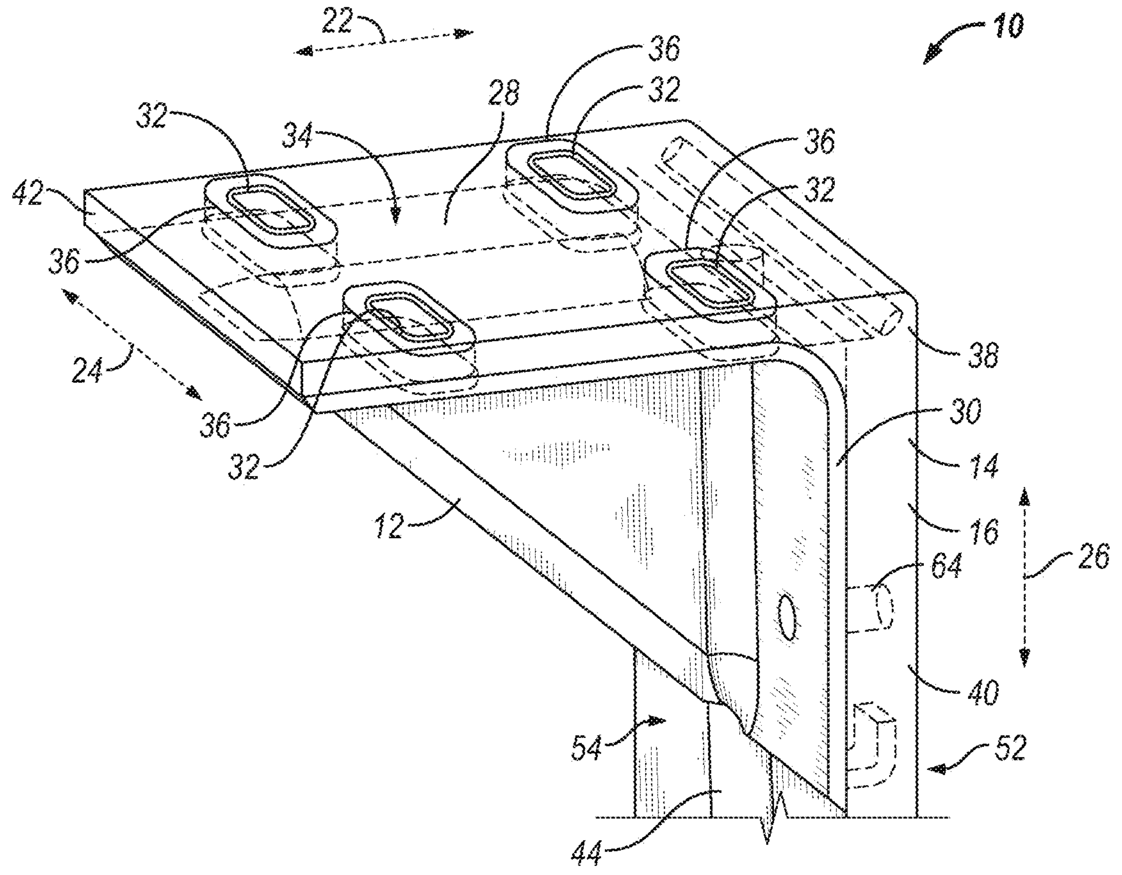
FIG. 9 is a perspective view of the apparatus with the bending member shown in transparency The use of identical or similar reference numerals in different figures denotes identical or similar features.

FIG. 9 is a perspective view of the top portion of the apparatus 10 in accordance with an exemplary embodiment in which the unitary section 16 is bent over the top of the trailer mounting bracket 12 and is shown as a transparent object so that one can see the configuration of the top surface 28. The top surface 28 has a planar portion 34 but it does not extend over the entire top surface 28. Instead, the planar portion 34 is broken up into two parts with a convex section of the top surface 28 between the two parts in order to space them in the lateral direction 22. The convex section of the top surface strengthens the trailer mounting bracket 12 and facilitates the strut positioning to in turn allow the stiffening member 44 to be able to bend within the trailer mounting bracket 12. There are four embossments 32 with two of them in one part of the planar portion 34 and the other two in the other part of the planar portion 34. Two of the embossments 32 are located at the same position in the lateral direction 22, and the other two of the embossments 32 are spaced from them in the lateral direction 22 but are likewise each located at the same identical position in the lateral direction 22. The four embossments 32 are also spaced in the longitudinal direction 24 so that two of them are at one longitudinal position, and the other two are at a different position in the longitudinal direction 24. Although four embossments 32 are shown, any number or zero are possible in other configurations of the apparatus 10.

The apparatus 10 includes a bending member 14 that is a flexible, yet stiff attachment method to hold the skirt 18 and withstand wind loading but allow the skirt 18 to be impacted and resist damage. The unitary section 16 is made of a material capable of withstanding temperature extremes to not break, lose significant stiffness, or detach from the skirt 18. The unitary section 16 is robust to high frequency vibration and resists fatigue. The bending member 14 can return to the normal, at rest position after deflection force is removed without driver intervention. This return to the at rest position can occur regardless of whether the force of deflection was applied inboard or outboard in the lateral direction 22.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be apparent.

I claim:

1. An apparatus for attaching a trailer skirt to a trailer, the apparatus comprising:

a trailer mounting bracket configured to be mounted onto the trailer, the trailer mounting bracket including a side surface and a top surface and being made of a first material; and a bending member having at least one section made of a second material, the at least one section including:

a first portion that engages and extends downwardly from the side surface of the trailer mounting bracket, a second portion that engages the top surface, and an integrally formed hinge located between the first portion and the second portion, wherein the first material is more stiff than the second material, and wherein the bending member is configured to deflect from an at rest position upon application of a force on the bending member, and to return to the at rest position upon removal of the force from the bending member.

2. The apparatus of claim 1, wherein the bending member extends continuously from the side surface to engagement with the top surface.

3. The apparatus of claim 1, wherein the top surface has a plurality of embossments that extend in a vertical direction from a planar portion of the top surface, and wherein the bending member has a plurality of embossment apertures that receive the plurality of embossments.

4. The apparatus of claim 1, wherein the bending member includes a stiffening member that is made of a third material, and wherein the third material has a stiffness that is greater than a stiffness of the second material.

5. The apparatus of claim 4, wherein the stiffening member is spaced from a bottom terminal end of the bending member.

6. The apparatus of claim 4, wherein the stiffening member is located inside of the at least one section.

7. The apparatus of claim 4, wherein the first portion includes:

a skirt facing surface that is configured to engage the trailer skirt, and an inboard surface opposite the skirt facing surface, wherein the stiffening member is located on the inboard surface.

8. The apparatus of claim 1, wherein the bending member is made entirely of the second material.

9. The apparatus of claim 1, further comprising a fastener that attaches the bending member to the trailer mounting bracket.

10. An apparatus for attachment to a trailer skirt, the apparatus comprising:

a trailer mounting bracket configured to be mounted onto a trailer and having a top surface and an outwardly facing side surface; and a bending member having a first portion on top of the top surface and a second portion engaging the outwardly facing side surface and extending downwardly therefrom, the bending member having zones of stiffness in which some zones are stiffer than other zones, and the bending member configured to deflect from an at rest position upon application of a force on the bending member, and to return to the at rest position upon removal of the force from the bending member.

11. The apparatus of claim 10, wherein the bending member includes:

a unitary section made of a first material, the unitary section including the first portion and the second portion, and a stiffening member made of a second material that is stiffer than the first material, wherein at least one of a size, shape, or location of the stiffening member determines a location of the zones of stiffness.

12. The apparatus of claim 10, wherein the bending member has a varying thickness that determines a location of the zones of stiffness.

13. The apparatus of claim 10, wherein the bending member includes portions made of materials having different durometers, and wherein a location of the materials having different durometers determines a location of the zones of stiffness.

14. The apparatus of claim 10, wherein the first portion is integrally formed with the second portion such that the bending member extends continuously from the outwardly facing side surface to engagement with the top surface.

15. The apparatus of claim 10, wherein the bending member further includes an integrally formed hinge located between the first portion and the second portion.

16. An apparatus comprising:

a trailer mounting bracket configured to be mounted onto a trailer, the trailer mounting bracket including a side surface and a top surface and being made of a first material;

a bending member configured to be attached to a trailer skirt and including at least one section made of a second material;

a first fastener that attaches the bending member to the side surface; and a second fastener that attaches the bending member to the top surface, wherein the first material is more stiff than the second material.

17. The apparatus of claim 16, wherein the trailer mounting bracket includes a first aperture, wherein the bending member includes a second aperture, and wherein the first fastener is disposed through the first aperture and the second aperture.

18. The apparatus of claim 16, wherein the top surface includes a first planar part, a second planar part, and a convex section between the first planar part and the second planar part.

19. The apparatus of claim 16, wherein the bending member has a length in a vertical direction that is longer than a length of the bending member in a longitudinal direction.

20. The apparatus of claim 16, wherein the trailer mounting bracket includes a first aperture, wherein the bending member includes a second aperture, and wherein the second fastener is disposed through the first aperture and the second aperture.

* * * * *